(12) United States Patent
Noda

(10) Patent No.: US 10,725,000 B2
(45) Date of Patent: Jul. 28, 2020

(54) CHROMATOGRAM DATA PROCESSING METHOD AND DEVICE

(71) Applicant: Shimadzu Corporation, Kyoto (JP)

(72) Inventor: Akira Noda, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 222 days.

(21) Appl. No.: 16/068,197

(22) PCT Filed: Jan. 6, 2016

(86) PCT No.: PCT/JP2016/050270
§ 371 (c)(1),
(2) Date: Jul. 5, 2018

(87) PCT Pub. No.: WO2017/119086
PCT Pub. Date: Jul. 13, 2017

(65) Prior Publication Data
US 2019/0011408 A1 Jan. 10, 2019

(51) Int. Cl.
*G01R 15/00* (2006.01)
*G01N 30/86* (2006.01)
(52) U.S. Cl.
CPC ......... *G01N 30/8631* (2013.01); *G01N 30/86* (2013.01); *G01N 30/8613* (2013.01);
(Continued)
(58) Field of Classification Search
None
See application file for complete search history.

(56) References Cited

U.S. PATENT DOCUMENTS 5,969,228 A 10/1999 Gorenstein
2014/0179020 A1* 6/2014 Wright ............... H01J 49/0036
436/173
(Continued)

FOREIGN PATENT DOCUMENTS

JP 3130931 B 3/1994
JP 2007-527992 A 10/2007
(Continued)

OTHER PUBLICATIONS

"Let's Confirm Peak Waveform Processing," [online], Shimadzu Corporation, [searched on Nov. 13, 2015], Internet <URL:http://www.an.shimadzu.co.jp/hplc/support/lib/lctalk/23/23lab.htm>.
(Continued)

*Primary Examiner* — Aditya S Bhat
(74) *Attorney, Agent, or Firm* — Maier & Maier, PLLC

(57) ABSTRACT

Wavelength spectrums of peaks detected on a chromatogram based on observation data to be processed are extracted to create a spectrum set $\{S_n'\}$ in which the intensity values of the spectrums are normalized (S10, S11). One wavelength spectrum is selected from the set, and a vector of the wavelength spectrum at each point in time of measurement based on the observation data is projected so as to be perpendicular to the vector of the selected spectrum (S12 to S14). The vectors of the wavelength spectrums in the set $\{S_n'\}$ are also similarly projected (S15). Consequently, the selected spectrum is erased from the set $\{S_n'\}$. The processes from S12 to S16 are repeated until the set $\{S_n'\}$ does not include a spectrum, and the obtained signals are added (S17). The signal resulting from the addition is a signal indicating the waveform shape of an unknown baseline. A baseline spectrum is obtained by fitting the signal to a chromatogram at each wavelength obtained from the observation data, and a baseline signal at each wavelength is calculated from the baseline spectrum and the baseline
(Continued)

chromatogram. As a result, a baseline can be automatically estimated without setting of a parameter and the like by a user.

6 Claims, 5 Drawing Sheets

(52) U.S. Cl.
CPC ..... *G01N 30/8617* (2013.01); *G01N 30/8641* (2013.01); *G01N 2030/862* (2013.01)

(56) References Cited

U.S. PATENT DOCUMENTS

| | | |
|---|---|---|
| 2016/0033457 A1 | 2/2016 | Mishima et al. |
| 2016/0231297 A1 | 8/2016 | Noda et al. |

FOREIGN PATENT DOCUMENTS

| | | |
|---|---|---|
| JP | 2009-204397 A | 9/2009 |
| WO | 1997/039347 A1 | 10/1997 |
| WO | 2005/079263 A2 | 9/2005 |
| WO | 2014/136539 A1 | 9/2014 |
| WO | 2015/056311 A1 | 4/2015 |

OTHER PUBLICATIONS

International Search Report and Written Opinion dated Apr. 12, 2016 of corresponding application No. PCT/JP2016/050270; 5 pgs.
International Preliminary Report on Patentability dated Jul. 10, 2018 of corresponding application No. PCT/JP2016/050270; 11 pgs.
Office Action dated Dec. 27, 2019 in corresponding Chinese Application No. 201680083134.1; 16 pages including English-language translation.
English translation of Written Opinion of the ISA dated Apr. 12, 2016 of corresponding International Application No. PCT/JP2016/050270; 5 pgs.

* cited by examiner (a) BASELINE IS NOT ESTIMATED (b) LINEAR BASELINE (c) CURVED BASELINE

CHROMATOGRAM DATA PROCESSING METHOD AND DEVICE

FIELD

The present disclosure relates to a chromatogram data processing method and a device that process three-dimensional chromatogram data collected by a liquid chromatograph (LC) and a gas chromatograph (GC) in which a multi-channel detector such as a photodiode array (PDA) detector or a mass spectrometer is used as a detector, and having not only parameters of time and signal intensity but also other parameters such as a wavelength and a mass-to-charge ratio. More specifically, the present invention relates to a chromatogram data processing method and a device that estimate a baseline of a chromatogram and that acquire a peak chromatogram obtained by removing a baseline from a chromatogram.

BACKGROUND

With the LC using the multi-channel detector such as the PDA detector, it is possible to obtain three-dimensional chromatogram data having three dimensions, namely, time, wavelength, and absorbance (signal intensity), by repeatedly obtaining an absorption spectrum over a predetermined wavelength range, from a sample liquid that flows out from a column outlet, while setting a point in time of injection of a sample to a mobile phase as a base point. With a liquid chromatograph mass spectrometer (LC-MS) or a gas chromatograph mass spectrometer (GC-MS), it is possible to obtain three-dimensional chromatogram data having three dimensions, namely, time, mass-to-charge ratio, and signal intensity (ion intensity), by repeating a scan measurement over a predetermined mass-to-charge ratio range using the mass spectrometer.

Portion (a) of FIG. 2 is a conceptual diagram of three-dimensional chromatogram data obtained by the LC described above. Through extraction of absorbance data in a time direction at a specific wavelength (for example, a wavelength $\lambda_0$) from such three-dimensional chromatogram data, a chromatogram at the wavelength $\lambda_0$ (hereinafter, referred to as a "wavelength chromatogram") as illustrated in Portion (b) of FIG. 2 can be created. Further, through extraction of absorbance data in a wavelength direction at a specific measurement time (for example, time tp) from the three-dimensional chromatogram an absorption spectrum at the specific measurement time tp can be created.

To carry our quantitative determination of a known compound included in a sample on the basis of such chromatogram data, a wavelength chromatogram at an absorption wavelength at which the target compound best absorbs light is typically created. The quantitative value is calculated by finding a peak derived from the target compound on the wavelength chromatogram, calculating an area value of the peak, and comparing the area value to a calibration curve obtained in advance. For this reason, to achieve accurate quantitative determination, it is important to accurately calculate the area value of the peak corresponding to the target compound on the chromatogram.

However, in general, a baseline derived from a mobile phase and the like is present on the wavelength chromatogram. Moreover, the peak derived from the target compound is sometimes overlapped with a peak derived from another compound. Therefore, in order to correctly calculate the peak area value corresponding to the target compound, it is necessary to find a true peak region excluding the influence of a baseline derived from the mobile phase and the like through correct estimation of the baseline.

A data processing device generally used in the LC system is provided with a peak waveform processing function that automatically estimates a baseline on the basis of a chromatogram waveform obtained by measurement. However, depending on the shape of the chromatogram waveform, it is not possible to estimate a suitable baseline by the automatic waveform processing in many cases. To address this problem, as disclosed in Non-Patent Document 1, the data processing device of the known art is configured such that a user can estimate a more suitable baseline by manually changing or setting, as appropriate, the parameter of the waveform processing and the algorithm for the waveform processing to be applied.

FIG. 8 illustrates exemplary baselines and regions in which an area value of a peak P is to be calculated (region indicated by hatched lines in FIG. 8), wherein the baselines and the peak P are estimated from a chromatogram waveform, based on the waveform processing disclosed in Non-Patent Document 1. In FIG. 8, portion (a) is an example in which the peak is vertically divided by setting a signal zero level as the baseline, after removing negative peaks. Portion (b) is an example in which the bottoms of the peaks are connected by a straight line to form the baseline. Portion (c) is an example in which the bottoms of the peaks are connected by a curved line to form the baseline. From these examples, it is evident that the peak area values differ greatly depending on how the baseline is drawn.

In this respect, for example, when a user determines that the baseline drawn by the waveform processing based on a certain algorithm is not suitable, the user can calculate a more suitable baseline and improve the accuracy of the peak area value by selecting another waveform processing which uses a different algorithm. However, in this case, the user him/herself (for example, an operator who is responsible for the analysis) needs to determine whether to connect the bottoms of the adjacent peaks with a straight line or a curved line, or which portion is to be regarded as the base of the peak derived from the target compound when the base of the peak seems to be elongated. To make such a determination accurately, the operator needs to have a certain degree of experience or skills on the peak waveform processing. Moreover, the determination may differ depending on the operator in charge. As a result, the shape of the peak chromatogram waveform from which the baseline is removed, and the peak area value may vary even though the original chromatogram is the same.

The baseline present in the wavelength chromatogram at each wavelength influences the waveform shape of the absorption spectrum. Consequently, to identify the compound on the basis of the position of the peak appearing in the absorption spectrum (in other words, an absorption wavelength), the baseline needs to be suitably estimated for each of wavelength chromatograms at wavelengths different from one another. However, since an enormous number of wavelength chromatograms are obtained by a single measurement, it is practically impossible for a user to carry out the baseline estimation process for each of the wavelength chromatograms while manually setting a parameter and the like for each wavelength chromatogram.

CITATION LIST

Non-Patent Document

Non-Patent Document 1: "Let's Confirm Peak Waveform Processing," [online], Shimadzu Corporation, [searched on Nov. 13, 2015], Internet <URL: http://www.an.shimadzu.co.jp/hplc/support/lib/lctalk/23/23lab.htm>

SUMMARY

The present invention has been made to solve the problems described above, and it is an object of the present invention to provide a chromatogram data processing method and a device capable of estimating a suitable baseline of a chromatogram waveform, on the basis of the three-dimensional chromatogram data as described above, without requiring a user to carry out inputting or setting of a parameter which involves troublesome determinations.

Moreover, another object of the present invention is to provide a chromatogram data processing method and a device capable of automatically estimating a suitable baseline in each wavelength chromatogram obtained for each wavelength and in a mass chromatogram (extracted ion chromatogram) obtained for each mass-to-charge ratio.

A chromatogram data processing method according to the present invention that has been made to solve the problems described above processes three-dimensional chromatogram data collected from a sample to be measured and having a time axis, a signal intensity axis, and a third parameter axis, the chromatogram data processing method includes:

a) a peak spectrum acquiring step of acquiring a spectrum corresponding to a peak detected on a chromatogram created based on the three-dimensional chromatogram data to be processed, the spectrum indicating a relation between a third parameter value and a signal intensity value; and b) a baseline chromatogram waveform estimating step of estimating a waveform shape of a baseline chromatogram indicating a baseline in the chromatogram based on a time series signal, by projecting a multi-dimensional vector which is a vector representation of a spectrum at each of a plurality points in time of measurement based on the three-dimensional chromatogram data in a direction perpendicular to a vector of a vector representation of the spectrum obtained at the peak spectrum acquiring step, and calculating a magnitude of a projection vector obtained accordingly as the time series signal.

Moreover, a chromatogram data processing device according to the present invention is a device for executing the chromatogram data processing method according to the present invention. The chromatogram data processing device processes three-dimensional chromatogram data collected from a sample to be measured and having a time axis, a signal intensity axis, and a third parameter axis, the chromatogram data processing device includes:

a) a peak spectrum acquisition unit configured to acquire a spectrum corresponding to each of a plurality of peaks detected on a chromatogram created based on the three-dimensional chromatogram data to be processed, the spectrum indicating a relation between a third parameter value and a signal intensity value; and b) a baseline chromatogram waveform estimation unit configured to estimate a waveform shape of a baseline chromatogram indicating a baseline in the chromatogram based on a time series signal, by projecting a multi-dimensional vector which is a vector representation of a spectrum at each of a plurality points in time of measurement based on the three-dimensional chromatogram data in a direction perpendicular to a vector of a vector representation of the spectrum obtained by the peak spectrum acquisition unit, and calculating a magnitude of a projection vector obtained accordingly as the time series signal.

The "third parameter axis" described above is a wavelength axis when the three-dimensional chromatogram data is collected by causing a multichannel detector such as a PDA detector to repeatedly obtain an absorption spectrum, a fluorescence spectrum, and the like from a sample including various compounds that are separated in a time direction by a column of a chromatograph.

Alternatively, the "third parameter axis" described above is a mass-to-charge ratio m/z axis when the three-dimensional chromatogram data is collected by causing a mass spectrometer to repeatedly obtain a mass spectrum from a sample including various compounds that are separated in a time direction by a column of a chromatograph.

Furthermore, the "third parameter axis" described above is time (holding time) when the three-dimensional chromatogram data is collected by a comprehensive two-dimensional chromatograph such as a comprehensive two-dimensional GC and a comprehensive two-dimensional LC. In this case, two of the three axes are time axes, and the time increment of one of the two time axes is large and the time increment of the other time axis is small.

The "three-dimensional chromatogram data" used herein may be data obtained from a sample introduced, by a flow injection analysis (FIA) method, to the multi-channel detector such as the PDA detector or the mass spectrometer without being separated into components, instead of the sample separated into components by passing through the column of the chromatograph.

In the chromatogram data processing method and the device according to the present invention, a spectrum indicating a relation between the third parameter value and the signal intensity value, such as an absorption spectrum and a mass spectrum, is handled as a multi-dimensional vector of a vector representation. For example, since a set of degrees of absorbance at discrete wavelengths constitutes an absorption spectrum, the absorption spectrums can be expressed as $(a(\lambda 1), a(\lambda 2), a(\lambda 3), \ldots, a(\lambda n))$. Thus, a multi-dimensional vector having $a(\lambda m)$ as a component can be defined. Here, $a(\lambda m)$ represents the absorbance at a wavelength m ($\lambda=1$ to n). Moreover, a chromatogram can be similarly handled as a multi-dimensional vector.

The three-dimensional chromatogram data to be processed can be modelled as a sum of direct products of a vector representation, of chromatogram of each compound, that is plotted on a plane with two axes of the time axis and the signal intensity axis, and a vector representation, of a spectrum at each point in time of measurement, that is plotted on a plane with two axes of the third parameter axis (for example, a wavelength axis or a mass-to-charge ratio axis) and the signal intensity axis. If two compounds are included in the sample, a three-dimensional chromatogram data D obtained from the sample can be modelled by the following formula:

$$D = C_1 \cdot S_1^T + C_2 \cdot S_2^T$$

wherein, $C_1$ and $C_2$ are respectively vector representations of chromatogram signals associated with first and second compounds, and $S_1$ and $S_2$ are respectively vector representations of wavelength spectrum signals at first and second points in time of measurement.

When the wavelength spectrum $S_1$ of the first compound is known, it is possible to obtain a vector $R_1$ perpendicular to the wavelength spectrum $S_1$. When the vector $R_1$ is multiplied by the three-dimensional chromatogram data D expressed by the above formula, the term associated with the first compound on the right side of the above formula is erased, and $\alpha \cdot C_2$ which corresponds to multiplication of the chromatogram signal $C_2$ of the second compound by a constant (an inner product of the vector of the wavelength spectrum $S_2$ and the vector $R_1$) is obtained. This $\alpha \cdot C_2$ is a vector indicating the waveform shape of the chromatogram signal $C_2$ of the second compound. This applies even if the number of compounds included in the sample is three or more. In other words, when two or more compounds are included in the sample, it is possible to determine the waveform shape of a chromatogram signal of one unknown compound, as long as the wavelength spectrum of the one compound is unknown and the wavelength spectrums of all the other compounds are known.

This also means that if a baseline is assumed to be a chromatogram of an unknown compound, the waveform shape of an unknown baseline can be determined in a situation where the wavelength spectrums of all peaks (peaks corresponding to all compounds) that appear on the chromatogram are known. The chromatogram data processing method and the device according to the present invention estimate the baseline waveform shape under such principle.

Specifically, according to the chromatogram data processing method of the present invention, in the peak spectrum acquiring step, peaks are detected on the chromatogram created on the basis of the three-dimensional chromatogram data to be processed, and a spectrum corresponding to each of the detected peaks is acquired. It is suitable to obtain one spectrum per one peak, in other words, per one compound. Consequently, the spectrums of all compounds except the unknown baseline will be known. In the baseline chromatogram waveform estimating step, which is subsequently performed, each of the vectors of the spectrums at points in time of measurement based on the three-dimensional chromatogram data is projected in the direction perpendicular to the vector of the spectrum obtained correspondingly to the peak, as described above, and the magnitude of the projection vector is obtained as a signal value at each point in time of measurement, in other words, as a time series signal. As a result, a signal corresponding to $\alpha \cdot C_2$ described above, in other words, a signal indicating the baseline waveform shape is obtained.

When a plurality of peaks are detected on the chromatogram, and a plurality of spectrums correspond to the peaks, for example, a time series signal based on the magnitude of the projection vector in a direction perpendicular to the vector corresponding to each of the spectrums may be calculated, and a single time series signal can be obtained by adding a plurality of time series signals for each point in time of measurement. However, to add the time series signals in this manner, the magnitude reference of the signals needs to be uniform. Therefore, for example, it is preferable to perform the baseline chromatogram waveform estimating step after normalizing the signal intensities of the spectrums corresponding to the peaks.

Even in a situation where the intensity value itself of the baseline is unknown, if the baseline waveform shape can be estimated as described above, it is possible to determine which of a plurality of baseline candidates estimated by various conventional baseline estimation methods is more suitable, on the basis of the estimation result, for example.

Moreover, a first preferable aspect of the chromatogram data processing method according to the present invention further includes a baseline spectrum estimating step of estimating a baseline spectrum indicating a relation between the third parameter value and the signal intensity value at the baseline, based on the signal intensity value of the baseline for each third parameter value, the signal intensity value being determined by fitting the baseline chromatogram waveform obtained at the baseline chromatogram waveform estimating step to a part or each of a plurality of parts of the chromatogram of each third parameter value created based on the three-dimensional chromatogram data.

Because a constant $\alpha$ for each third parameter value can be obtained when the baseline spectrum is calculated by the first aspect described above, the baseline in the chromatogram for each third parameter value can be obtained. Consequently, it is possible to create a peak chromatogram which has only a peak and from which the baseline has been removed, for the third parameter value, for example, for each wavelength and each mass-to-charge ratio.

Also, according to the chromatogram data processing method of the present invention, it is preferable that in the peak spectrum acquiring step, a filter configured to output zero in response to input of a signal waveform with a slow time variation and to output nonzero in response to input of a signal waveform with an abrupt time variation is used to estimate a time range in which the peak is present on the chromatogram, and a spectrum corresponding to a peak is obtained within the time range.

In this example, the filter described above may be a Savitzky-Golay filter or the like, for example.

In general, the time variation of a signal on the baseline is much slower than the time variation of a peak signal. For this reason, use of the filter having the characteristics described above makes it possible to detect a peak derived from a compound quite accurately and speedily. Needless to say, it is possible to use the method using such a filter in combination with the other peak detection method.

It is suitable that the filter includes a filter parameter set to maximize a ratio between an output with respect to a signal of a time range in which only a baseline is present or in which only a baseline is estimated to be present in a given chromatogram, and an output with respect to a signal of a time range in which a peak is present or in which a peak is estimated to be present.

For example, the chromatogram data processing method and the device according to the present invention can highly accurately estimate a baseline waveform shape overlapped with a chromatogram created on the basis of three-dimensional chromatogram data collected through chromatograph using a multichannel detector such as a PDA detector or a mass spectrometry as a detector, without requiring a user to carry out inputting or setting of a parameter which involves troublesome determinations. Consequently, for example, it is possible to correctly determine which of baseline candidates estimated by various conventional baseline estimation methods is more suitable, and to perform baseline correction with a high accuracy on the basis of the estimation result of the baseline waveform shape.

Moreover, the first aspect of the chromatogram data processing method according to the present invention makes it possible to estimate a baseline in a chromatogram for each wavelength, each mass-to-charge ratio, and the like. Consequently, a peak chromatogram which has only a peak and from which the baseline has been accurately removed can be created for each wavelength and each mass-to-charge ratio, enabling highly accurate quantitative determination on the basis of a correct area value of a peak corresponding to each compound, for example.

DETAILED DESCRIPTION

An embodiment of chromatogram data processing method and device according to the present invention will be described in detail below with reference to the accompanying drawings.

Figure 1:
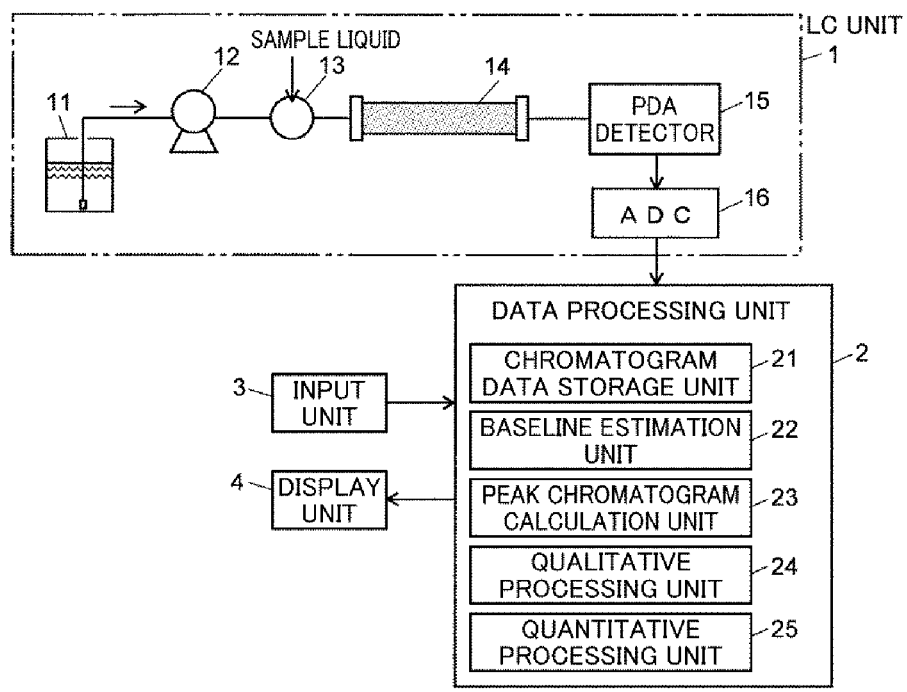
FIG. 1 is a schematic configuration diagram of an embodiment of an LC device including a data processing device that performs a chromatogram data processing method according to the present invention.

FIG. 1 is a schematic configuration diagram of an embodiment of a liquid chromatogram (LC) device including a data processing device that performs the chromatogram data processing method according to the present invention.

The LC device of the present embodiment includes an LC unit 1, a data processing unit 2, an input unit 3, and a display unit 4. In the LC unit 1, a liquid feed pump 12 sucks a mobile phase from a mobile phase container 11 and transfers the mobile phase to an injector 13 at a constant flow rate. The injector 13 injects a sample liquid into the mobile phase at a predetermined timing. The injected sample liquid is pushed by the mobile phase, and is introduced to a column 14. While the sample liquid passes through the column 14, compounds in the sample liquid are separated and eluted in a time direction. A PDA detector 15 connected to an outlet of the column 14 repeatedly measures the absorbance distribution (absorption spectrum) over a predetermined wavelength range of the eluate successively introduced over time. An analog-digital converter (ADC) 16 converts the signals obtained through the measurement to digital data, and inputs the digital data to the data processing unit 2 as three-dimensional chromatogram data.

The data processing unit 2 that receives the data described above includes functional blocks such as a chromatogram data storage unit 21, a baseline estimation unit 22, a peak chromatogram calculation unit 23, a qualitative processing unit 24, and a quantitative processing unit 25. The chromatogram data storage unit 21 stores therein the three-dimensional chromatogram data. The baseline estimation unit 22 estimates a baseline of a chromatogram on the basis of the three-dimensional chromatogram data. The peak chromatogram calculation unit 23 calculates a peak chromatogram from which the baseline is removed by using the estimated baseline. The qualitative processing unit 24 identifies compounds by performing qualitative processing on the basis of the calculated peak chromatogram. The quantitative processing unit 25 performs a quantitative calculation on the basis of the peak chromatogram. For example, the input unit 3 connected to the data processing unit 2 is used by a user for inputting various parameters and the like required for data processing. The display unit 4 displays a graph such as a chromatogram and qualitative and quantitative results for the user.

Usually, the entity of the data processing unit 2 is a personal computer or a work station having a higher performance than the personal computer. The functional blocks described above may be embodied by causing a computer to operate dedicated data processing software installed in the computer in advance.

Figure 2:
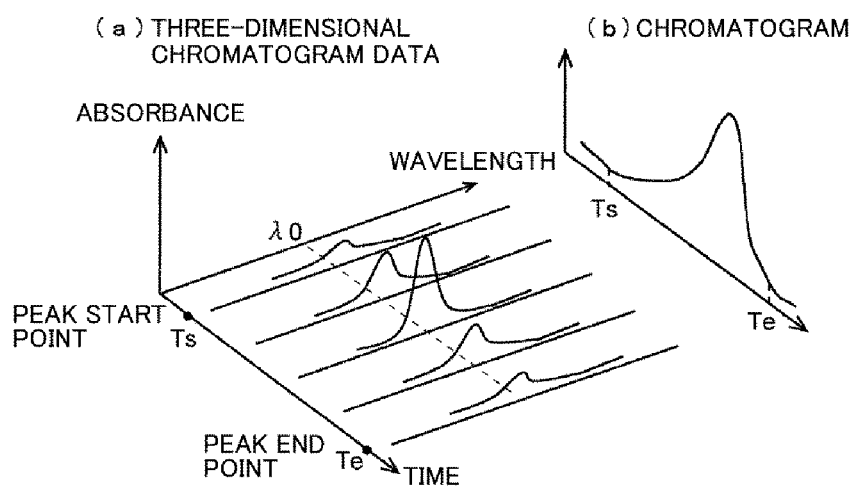
In FIG. 2, Portion (a) is a conceptual diagram of three-dimensional chromatogram data obtained by LC analysis, and Portion (b) illustrates an example of a wavelength chromatogram.

In an LC analytical device of the present embodiment, the LC unit 1 performs an LC analysis on one sample. Consequently, the three-dimensional chromatogram data as illustrated in Portion (a) of FIG. 2 in a time range from a point in time when the sample is injected, in other words, from a measurement start point to a measurement end point is collected. The three-dimensional chromatogram data is then stored in the chromatogram data storage unit 21 as a single data file. When a user (hereinafter, referred to as an operator) specifies a data file to be processed and instructs peak waveform processing to be executed via the input unit 3, the baseline estimation unit 22 and the peak chromatogram calculation unit 23 perform characteristic data processing as will be described below.

Figure 3:
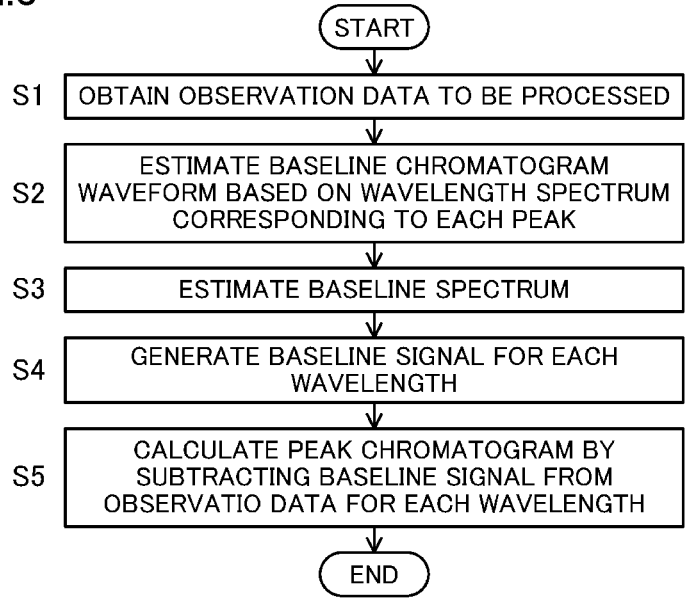
FIG. 3 is a schematic flowchart of the entire peak waveform processing performed by the LC device of the present embodiment.

FIG. 3 is a schematic flowchart of the entire peak waveform processing.

In this example, the absorption spectrum and the chromatogram are each handled as a multi-dimensional vector represented by a vector. For example, because a set of degrees of absorbance at discrete wavelengths constitutes an absorption spectrum, the absorption spectrums can be expressed as $(a(\lambda 1), a(\lambda 2), a(\lambda 3), \ldots, a(\lambda n))$. Thus, a multi-dimensional vector having $a(\lambda m)$ as a component can be defined. Here, $a(\lambda m)$ represents the absorbance at a wavelength m ($\lambda = 1$ to n).

Three-dimensional chromatogram data D that is an object to be processed and that has three dimensions, namely, wavelength, time, and signal intensity can be modelled as a sum of direct products of a vector representation of a chromatogram signal that indicates a relation between the time and a signal intensity value of each of the compounds in the sample, and a vector representation of a wavelength spectrum (absorption spectrum) signal that indicates a relation between the wavelength at each measurement time and the signal intensity value. That is, the three-dimensional chromatogram data D can be modeled by the following formula (1):

$$D = C_1 \cdot S_1^T + C_2 \cdot S_2^T + \ldots + C_m \cdot S_n^T \tag{1}$$

wherein $C_1$ to $C_m$ denote vector representations of chromatogram signals with respect to the first to m-th compounds, and $S_1$ to $S_n$ denote vector representations of wavelength spectrum signals at the first to n-th measurement times (points in time of measurement).

In this example, the following three conditions are defined as the prerequisites for estimating the baseline. It is to be noted that these conditions are valid for the LC analysis and the like.

[Condition A] The baseline is the main signal component and there is no other significant signal component in at least one end of the chromatogram data to be processed (in other words, the start point or the end point of the entire measurement time range). In other words, there is no signal component derived from compounds.

[Condition B] Variation of the baseline is sufficiently slow compared to the signal variation of the peak derived from compounds. In other words, the time variation is small.

[Condition C] The wavelength spectrum of the baseline is different from the wavelength spectrum of any of the compounds.

Under the three conditions described above, the baseline estimation unit 22 and the peak chromatogram calculation unit 23 calculate the peak chromatogram from which the baseline is removed by estimating the baseline through the following procedures.

First, the baseline estimation unit 22 reads out the three-dimensional chromatogram data (hereinafter, referred to as "observation data") obtained through the LC analysis from the chromatogram data storage unit 21 (step S1), and estimates the waveform shape of the baseline chromatogram indicating the time variation of the baseline in the chromatogram, on the basis of the wavelength spectrum calculated from the observation data (step S2). In this process, only the shape of the waveform is determined, and the intensity value of each wavelength is unknown.

Next, the peak chromatogram calculation unit 23 estimates the intensity value of the baseline chromatogram at each wavelength, in other words, the wavelength spectrum of the baseline (hereinafter, referred to as a "baseline spectrum") on the basis of the baseline chromatogram waveform estimated at step S2 (step S3). The peak chromatogram calculation unit 23 then obtains a baseline signal in the chromatogram at each wavelength, by a direct product of the vector of the baseline chromatogram and the vector of the baseline spectrum (step S4). The peak chromatogram calculation unit 23 then subtracts the baseline signal from the observation data for each wavelength, thereby calculating a peak chromatogram which has only a peak waveform and from which the baseline has been removed (step S5).

The processes from step S2 to step S5 described above will be explained in detail. Here, to simplify the explanation, the sample is assumed to only include two compounds: a first compound and a second compound. In this case, the observation data D is expressed by the formula (2).

$$D = C_1 \cdot S_1^T + C_2 \cdot S_2^T \quad (2)$$

If the wavelength spectrum $S_1$ of the first compound is known, it is possible to determine a vector $R_1$ perpendicular to the vector of the wavelength spectrum $S_1$. When the vector $R_1$ is multiplied by the observation data D, $\alpha \cdot C_2$ which corresponds to multiplication of the vector of a chromatogram signal $C_2$ of the second compound by a constant (an inner product of the vector of the wavelength spectrum $S_2$ and the vector $R_1$) is obtained as described by the following formula (3):

$$D \cdot R_1 = C_1 \cdot S_1^T \cdot R_1 + C_2 \cdot S_2^T \cdot R_1 = 0 + C_2 \cdot (S_2^T \cdot R_1) = \alpha \cdot C_2 \quad (3)$$

This $\alpha \cdot C_2$ indicates the waveform shape of the chromatogram signal $C_2$ of the second compound.

Even if the number of compounds included in the sample is three or more, the same applies as long as the wavelength spectrum of one of the three or more compounds is unknown and the wavelength spectrums of all the other compounds are known. This means that if the baseline is assumed as the chromatogram of a single unknown compound, and the wavelength spectrums of all peaks (peaks corresponding to all compounds) that appear on the chromatogram are known, it is possible to determine the shape of an unknown baseline. The baseline is estimated herein under such principle.

Figure 5:
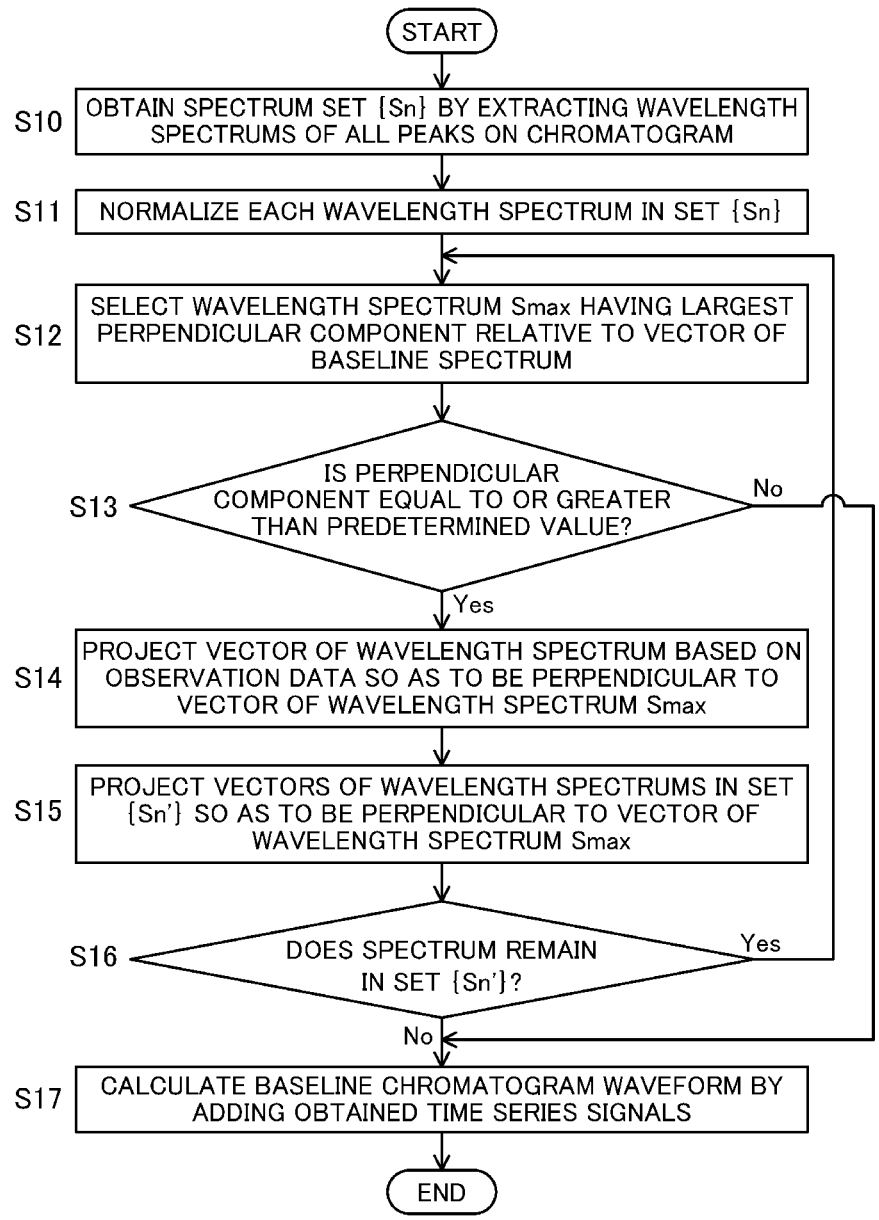
FIG. 5 is a flowchart of a baseline chromatogram waveform estimation process that the LC device of the present embodiment performs based on a peak spectrum.

FIG. 5 is a flowchart illustrating a detailed procedure of a baseline chromatogram waveform estimation process at step S2 described above.

The baseline estimation unit 22 extracts all peaks by performing peak detection on the chromatogram created on the basis of the observation data. The baseline estimation unit 22 then extracts the wavelength spectrum at the point in time of measurement of the peak top of each peak on the chromatogram, and obtains a spectrum set $\{S_n\}$ in which the wavelength spectrums are collected (step S10).

In this process, the condition B described above is used to detect the peak corresponding to each of the compounds from which the influence of the wavelength spectrum of the baseline has been removed. In other words, because the time variation of the baseline is slow, the baseline can be sufficiently and locally approximated by a polynomial. On the other hand, the signal variation of a peak derived from a compound that appears on the chromatogram is sufficiently abrupt compared to the variation of the baseline. Consequently, a systematic approximation error is generated when the baseline is to be approximated by a polynomial in a situation where the peak is present. The systematic approximation error is similarly generated in a plurality of wavelengths each having a peak. Therefore, the data from which the systematic error is extracted is a wavelength spectrum corresponding to a pure chromatogram peak without the influence of the baseline.

Thus, in this example, a filter is used to detect a peak. This filter is configured to output zero in response to a signal with only a slow change such as that in the baseline chromatogram and a signal with a simple change such as a linear change or an exponential change, and configured to output a systematic error, which is nonzero, in response to the peak signal. However, in the wavelength with a peak, the systematic error needs to be similarly generated in all the wavelengths. In other words, a value needs to be obtained by multiplying the height of the peak by a constant corresponding to the shape of the peak chromatogram, without depending on the ratio of the baseline and the peak height in the chromatogram. In that sense, this filer may be a linear filter. For example, such a filter may be a Savitzky-Golay filter or the like.

Figure 4:
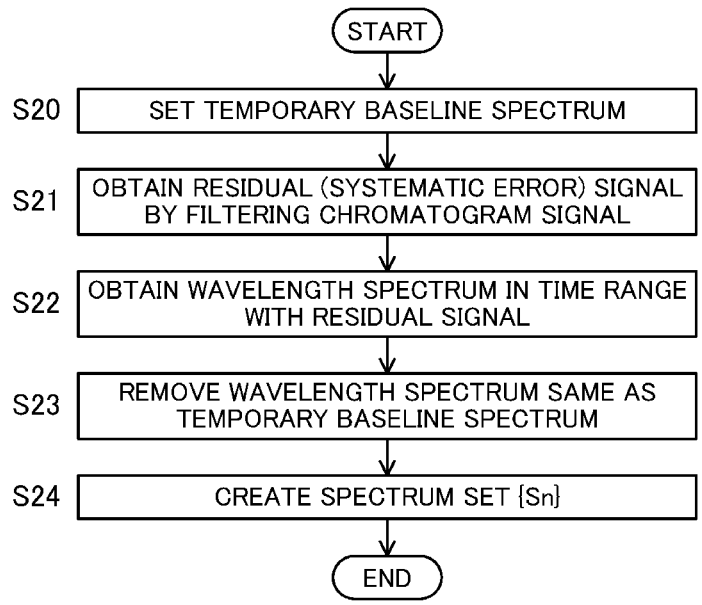
FIG. 4 is a flowchart illustrating a specific procedure that the LC device of the present embodiment performs to acquire a spectrum set $\{S_n\}$.

FIG. 4 is a flowchart illustrating an example of a specific procedure for acquiring the spectrum set $\{S_n\}$ at step S10 described above.

First, based on the condition A described above, the wavelength spectrum at the end of the measurement time range is defined as a temporary baseline spectrum (step S20). There are two "ends", i.e., a start point (measurement start point) and an end point (measurement end point) in the measurement time range, and the wavelength spectrum at one of the ends may be used. However, to improve the accuracy of the baseline estimation, it is preferable that in each of the case where the wavelength spectrum at the start point is selected and the case where the wavelength spectrum at the end point is selected, the subsequent processes are carried out, and take the average of the baselines estimated accordingly.

Next, a residual (systematic error) signal is obtained by approximating the chromatogram signal by a quadratic function for each wavelength using the Savitzky-Golay filter (step S21). Then, a time range in which the residual signal is present, in other words, in which the filter output is nonzero is taken out for each wavelength, to obtain the wavelength spectrum in the time range (step S22). Consequently, the wavelength spectrums corresponding to all peaks on the chromatogram are obtained. However, if any of the obtained wavelength spectrums is substantially the same as the temporary baseline spectrum, the wavelength spectrum is removed (step S23). This is because such a spectrum may cause a calculation error.

In this manner, the spectrum set $\{S_n\}$ is created by collecting the wavelength spectrums finally obtained (step S24).

Reference is made to FIG. 5 again. Once the spectrum set $\{S_n\}$ is obtained at step S10, each of the wavelength spectrums included in the set $\{S_n\}$ is normalized so that the L2 norm is 1 (step S11). Then, a wavelength spectrum Smax, of which the perpendicular component (magnitude of the vector in the perpendicular direction) with respect to the vector of the baseline spectrum is the largest, is selected from the normalized spectrum set $\{S_n'\}$ (step S12). Then, it is determined whether the perpendicular component is smaller than a predetermined value set in advance (step S13). When the value of the largest perpendicular component is smaller than the predetermined value, a determination is made that there is no peak to be separated, and the process proceeds from step S13 to step S17.

On the other hand, when the value of the largest perpendicular component is equal to or greater than the predetermined value, the process proceeds from step S13 to step S14, and the vector of the wavelength spectrum at each point in time of measurement obtained on the basis of the observation data is projected so as to be perpendicular to the vector of the selected wavelength spectrum Smax (step S14). More specifically, when the vector of the wavelength spectrum at a certain measurement point is defined as A, this A is updated to A−(A·Smax)·Smax. Moreover, the vectors of all of the wavelength spectrums included in the spectrum set $\{S_n'\}$ are projected so as to be perpendicular to the vector of the wavelength spectrum Smax described above (step S15). Consequently, the magnitude of the vector of the selected wavelength spectrum Smax becomes zero, and the wavelength spectrum is removed from the spectrum set $\{S_n'\}$. Thereafter, it is determined whether a wavelength spectrum remains in the spectrum set $\{S_n'\}$ (step S16). If a wavelength spectrum remains in the spectrum set $\{S_n'\}$, the process returns from step S16 to step S12, and the processes from step S12 to step S16 will be repeated.

When it is determined "No" at step S16, or when it is determined "No" at step S12, the chromatogram signal $C_2$ multiplied by various coefficients is present in the observation data in which only the perpendicular component remains. In other words, $\alpha \cdot C_2$ in which the value of $\alpha$ varies is present. At this time, the constant $\alpha$ may be negative. Therefore, a signal representing the baseline chromatogram waveform is calculated by adding all the signal values of the chromatogram signals at each of the points in time of measurement, after adjusting the constant $\alpha$ of the calculated chromatogram signal $\alpha \cdot C_2$ to positive (step S17). In this manner, the baseline chromatogram waveform is estimated.

Next, a procedure of estimating the baseline spectrum at step S3 described above will be explained.

With the condition A described above, the signal at the end of the measurement time range is only the baseline signal. It is thus suitable that the estimated baseline chromatogram waveform described above is fitted so as to match the height, in other words, the signal level of the baseline signal. However, the signal at the end of the measurement time range is not always suitable to be used as a reference for fitting, due to, for example, the influence of noise and the like. For this reason, a plurality of partial time ranges are obtained by dividing the entire measurement time range by a suitable number of sections being empirically defined, and the baseline chromatogram waveform is fitted to each of the partial time ranges as described above. Then, the partial time range to which the baseline chromatogram waveform fits best is suitably regarded as the time range in which only the baseline component is present.

Here, a determination on whether the baseline chromatogram waveform fits well can be made according to the following procedure.

First, a residual signal is calculated by fitting the baseline on the chromatogram based on the observation data, for each wavelength and for each partial time range. An L1 norm of the residual signal is defined as a score value indicating a degree of error at the fitting. Specifically, the score value decreases as the fitting improves.

However, when the baseline gradually increases, the estimation error of the chromatogram tends to increase accordingly. Thus, to correct the influence, it is preferable to calculate a peak-to-peak value of an input signal within the partial time range, and divide the score value by the square root of the peak-to-peak value. Moreover, when there are two or more partial time ranges having close score values, in other words, when a difference between the score values of two or more partial time ranges is within a predetermined range, it is suitable that the partial time range closer to the end of the measurement time range that is estimated to include only the baseline is preferentially handled. This can be achieved multiplying the score value of the partial time range close to the end by one time a weight, and by multiplying the score value of the partial time range away from the end by six times the weight at most. The score values obtained for the wavelengths of the partial time ranges are then summed up to calculate the final score value with respect to the partial time range. For example, to sum up the score values, weights may be assigned on the basis of empirical knowledge, the measurement result of the signal-to-noise (SN) ratio of the device, and the like.

Once the score value of each of the partial time ranges is calculated in this manner, the partial time range with the minimum score value is selected as the baseline section. Then, the intensity of each wavelength of the baseline, i.e., the baseline spectrum is determined according to the baseline of the baseline section.

The evaluation reference of the residual signal is not limited to the L1 norm, but an L2 norm, a maximum-minimum value, and the like may also be used. Apart from the fitting by dividing the time range into the partial time ranges, a moving window or a weighted moving window may also be used, and the fitting may be performed on each window.

The baseline chromatogram waveform and the baseline spectrum are calculated as described above. As explained earlier, the direct product of the baseline chromatogram waveform and the baseline spectrum constitutes a baseline signal at each estimated wavelength. The peak chromatogram in which the baseline is corrected, in other words, from which the influence of the baseline is removed, can be obtained by subtracting the baseline at the wavelength from the chromatogram at each wavelength obtained on the basis of the observation data.

Figure 6:
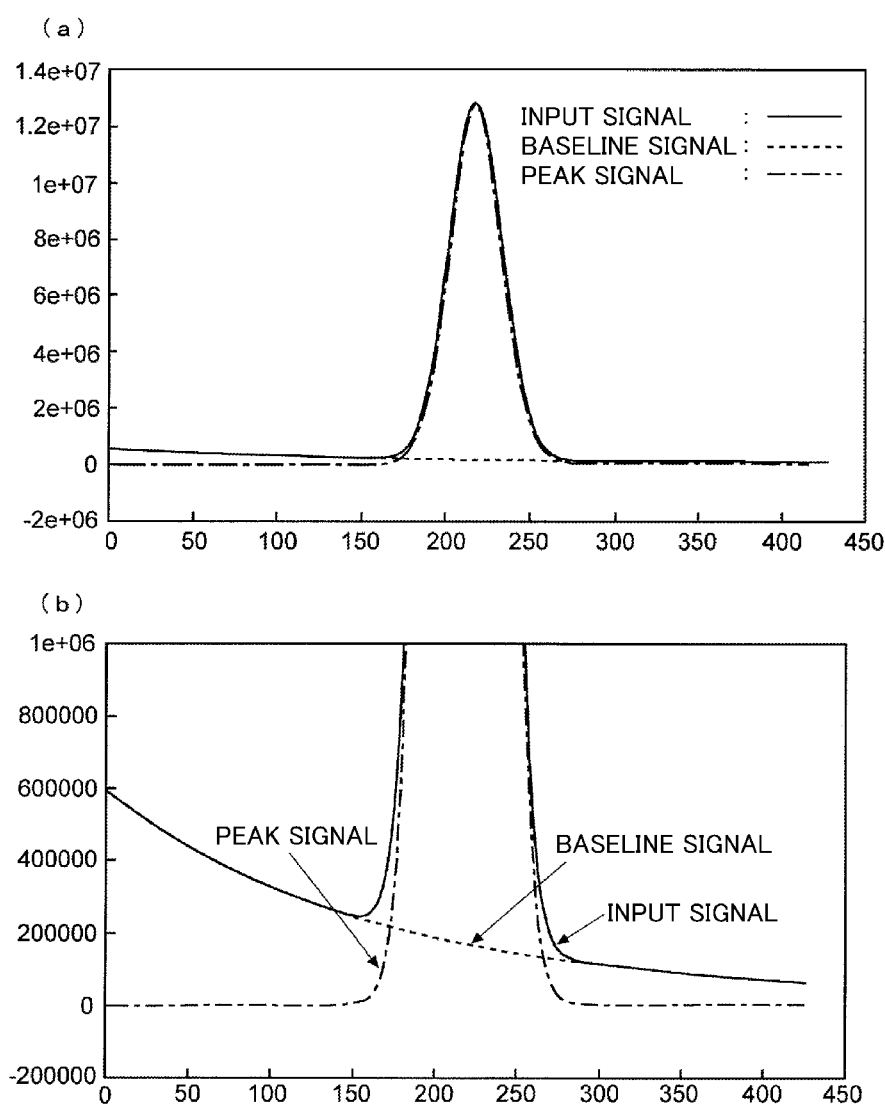
FIG. 6 is a chromatogram illustrating an example a result of separation of a baseline waveform from a peak waveform.
Figure 7:
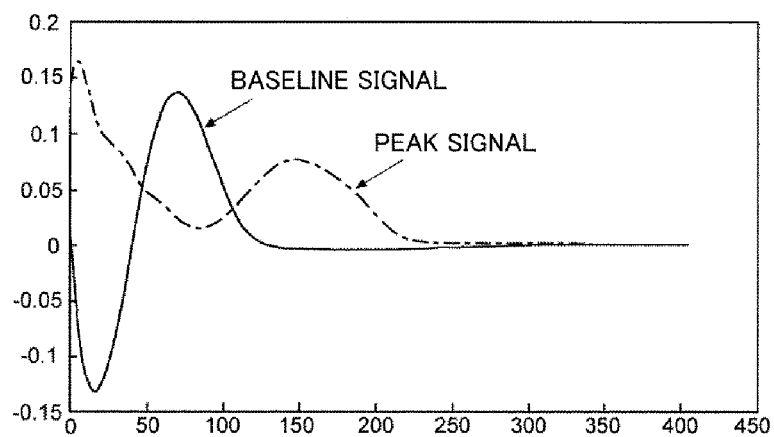
FIG. 7 is a wavelength spectrum illustrating an example of a result of separation of a baseline waveform from a peak waveform.

FIG. 6 is a chromatogram illustrating an example of a separation result of the baseline signal and the peak signal, when the chromatogram data processing method of the present embodiment is used. FIG. 7 is a spectrum illustrating an example of the same separation result. FIG. 6 and FIG. 7 are the results of separation of the baseline signal and the peak signal by applying the peak waveform processing described above, to data obtained by intentionally adding the exponential baseline to the chromatogram and the wavelength spectrum that were obtained by actual measurements. Portion (b) of FIG. 6 illustrate, on an enlarged scale, the time range in which the peak is present and a rising portion of the peak in Portion (a) of FIG. 6. From Portion (b) of FIG. 6, it is confirmed that a curved baseline is excellently estimated in the time range in which the peak is present, and consequently, the peak signal is excellently separated from the baseline. Moreover, FIG. 7 shows that the peak signal is excellently separated from the baseline signal, also in the wavelength spectrum.

In the processes described above, the peak chromatogram is calculated by using the baseline estimation result of the chromatogram. However, it is also possible to use the baseline estimation result to select the baseline calculated through various methods and algorithms, instead of performing the process of removing the baseline by using the baseline estimation result as it is.

Figure 8:
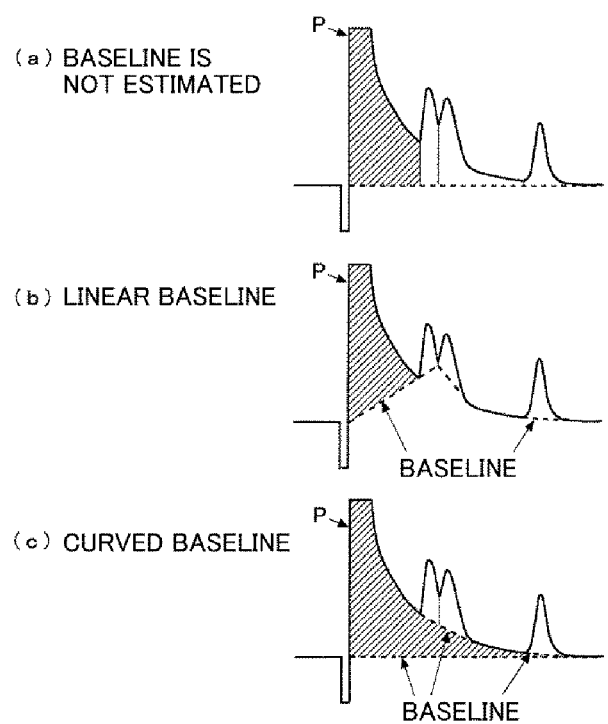
FIG. 8 illustrates exemplary baselines and regions in which an area value of a peak P is to be calculated, wherein the baselines and the peak P are estimated from a chromatogram waveform by a conventional peak waveform processing method.

For example, as described in the example in FIG. 8, the conventional data processing device is provided with a function of waveform processing for automatically calculating a curved baseline and the like using the linear baseline, a Gaussian function, and the like. Thus, once the baseline estimation result is obtained by the data processing described above, the most suitable baseline may be selected from the baselines that are calculated through a plurality of pieces of known waveform processing with reference to the obtained baseline estimation result.

Moreover, with the data processing method of the present embodiment, a pure wavelength spectrum of the peak on each chromatogram is calculated first, followed by calculation of the baseline chromatogram waveform and the baseline spectrum in this order. Thus, the compounds may be identified from the wavelength and the like of the absorption peak that appear on the wavelength spectrum, at the stage when the pure wavelength spectrum of the peak on the chromatogram is calculated.

Moreover, it is evident that the chromatogram data processing method and the LC analytical device of the embodiment described above are merely examples of the present invention, and are encompassed in the scope of claims of the present application even if modifications, additions, and corrections are made as appropriate within the spirit of the present invention.

For example, the chromatograph detector for acquiring three-dimensional chromatogram data that is a target to be processed in the present invention may not be a multichannel detector such as the PDA detector described above. The chromatograph detector for acquiring three-dimensional chromatogram data may also be an ultraviolet visible light spectrophotometer, an infrared spectrometer, a near-infrared spectrophotometer, a fluorescence spectrophotometer, or the like capable of performing high-speed wavelength scanning. Moreover, the chromatograph detector for acquiring three-dimensional chromatogram data may be a liquid chromatograph mass spectrometer and a gas chromatograph mass spectrometer in which a mass spectrometer functions as the detector as described above.

Not only the data obtained by the analysis through the column of the chromatograph, but also data obtained through detection of a sample introduced by a flow injection analysis (FIA) method using the PDA detector and the like are also three-dimensional data having three dimensions of time, wavelength, and signal intensity. Thus, the data is substantially the same as the three-dimensional chromatogram data collected by the liquid chromatograph. Thus, it is evident that the present invention is applicable to a device for processing such data.

The invention claimed is:

1. A chromatogram data processing method that processes three-dimensional chromatogram data collected for a sample to be measured and having a time axis, a signal intensity axis, and a third parameter axis, the chromatogram data processing method comprising:
   acquiring a spectrum corresponding to each of a plurality of peaks detected on a chromatogram created based on the three-dimensional chromatogram data to be processed, the spectrum indicating a relation between a third parameter value and a signal intensity value; and
   estimating step of estimating a waveform shape of a baseline chromatogram indicating a baseline in the chromatogram based on a time series signal, by projecting a multi-dimensional vector which is a vector representation of a spectrum at each of a plurality points in time of measurement based on the three-dimensional chromatogram data in a direction perpendicular to a vector of a vector representation of the spectrum obtained at the peak spectrum acquiring step, and calculating a magnitude of a projection vector obtained accordingly as the time series signal.

2. The chromatogram data processing method of claim 1, further comprising:
   estimating a baseline spectrum indicating a relation between the third parameter value and the signal intensity value at the baseline, based on the signal intensity value of the baseline for each third parameter value, the signal intensity value being determined by fitting the baseline chromatogram waveform obtained at the baseline chromatogram waveform estimating step to a part or each of a plurality of parts of the chromatogram of each third parameter value created based on the three-dimensional chromatogram data.

3. The chromatogram data processing method of claim 1, wherein in the peak spectrum acquiring step, a filter configured to output zero in response to input of a signal waveform with a slow time variation and to output nonzero in response to input of a signal waveform with an abrupt time variation is used to estimate a time range in which the peak is present on the chromatogram, and a spectrum corresponding to a peak is obtained within the time range.

4. The chromatogram data processing method of claim 3, wherein the filter is a Savitzky-Golay filter.

5. The chromatogram data processing method of claim 3, wherein the filter includes a filter parameter set to maximize a ratio between an output with respect to a signal of a time range in which only a baseline is present or in which only a baseline is estimated to be present in a given chromatogram, and an output with respect to a signal of a time range in which a peak is present or in which a peak is estimated to be present.

6. A chromatogram data processing device that processes three-dimensional chromatogram data collected for a sample to be measured and having a time axis, a signal intensity axis, and a third parameter axis, the chromatogram data processing device comprising:
   a peak spectrum acquisition unit configured to acquire a spectrum corresponding to each of a plurality of peaks detected on a chromatogram created based on the three-dimensional chromatogram data to be processed, the spectrum indicating a relation between a third parameter value and a signal intensity value; and a baseline chromatogram waveform estimation unit configured to estimate a waveform shape of a baseline chromatogram indicating a baseline in the chromatogram based on a time series signal, by projecting a multi-dimensional vector which is a vector representation of a spectrum at each of a plurality points in time of measurement based on the three-dimensional chromatogram data in a direction perpendicular to a vector of a vector representation of the spectrum obtained by the peak spectrum acquisition unit, and calculating a magnitude of a projection vector obtained accordingly as the time series signal.

* * * * *